Patented Jan. 20, 1942

2,270,731

UNITED STATES PATENT OFFICE 2,270,731

RUBBER CEMENT AND METHOD OF MAKING THE SAME

Edwin O. Groskopf, Rutherford, N. J., assignor to The Patent and Licensing Corporation, New York, N. Y., a corporation of Massachusetts No Drawing. Application November 27, 1937, Serial No. 176,810

7 Claims. (Cl. 260—760)

My present invention relates to cements adapted to be applied by brushing or spraying and particularly to such cements comprising, at least for the most part, rubber cut back with a suitable solvent.

Rubber cements and the like comprising either raw or reclaimed rubber cut back with a solvent such as naphtha, carbon tetrachloride, benzol or the like have conventionally been employed for cementing purposes in many industries. For example, in the construction of automobile bodies certain of the finish facing materials for the interior of the bodies are secured to the body parts by means of a thin coating of an adhesive material, preferably rubber cement. In order that the cementing operation may be carried out expeditiously, it has heretofore been proposed to apply the adhesive by spraying a thin layer of rubber cement onto the body parts to which the finish material is applied. It has been found, however, that rubber cements, i. e. those comprising rubber cut backs, although readily sprayable and capable of deposition in the desired adhesive film exhibit the disadvantage that they tend to "cobweb" as they issue from the spray gun. That is, the cement due to its elastic plastic nature tends to issue from the spray gun orifice in the form of solid stream and, when acted upon by the air jets, to break up into fine threads. Certain of these threads become entangled with one another in the air, the entangled mass thereof being carried by air currents to finally settle on surrounding objects. As will be readily apparent, the occurrence of the threads or webs of adhesive on portions of the work on which no adhesive is desired and/or on tools, machinery or other objects is decidedly objectionable. Thus, in the use of the rubber cement stated above, namely, to secure finish facing materials on car body parts, the loose cobwebs or tendrils of the cement may settle on the outer decorative face of the lining material and also on other parts of the car body, as well as on the hands of the workers and surrounding objects, to disfigure the material and greatly impede the carrying out of the operations performed on the car bodies.

The object of the present invention is to provide a rubber adhesive suitable for spray application which readily atomizes in the spray gun and which remains in the atomized state until striking the surface against which the spray is directed. A further object of the invention is to provide a method for obtaining rubber adhesives of the above stated characteristics.

The above noted objects are attained according to my invention by dispersing in rubber in the solid or semi-solid state, prior to the cutting back of the same with a solvent, a swollen colloidal material. After dissemination of the swollen colloidal material in the rubber, the rubber is cut back with a suitable solvent such as light petroleum naphtha, carbon tetrachloride, benzol or the like in any conventional or suitable manner and, if desired, any of the usual fillers, pigments or extenders or the like are added to the cut back to modify the resultant adhesive material.

Rubber-cements, prepared in the manner briefly described above, have been found to atomize in the spray gun to such an extent that substantially all of the material issues from the gun in the form of individual minute particles unconnected to adjacent particles. In other words, no strings or tendrils of the cement are produced and hence the above stated difficulties encountered in the spray application of conventional rubber cements are wholly overcome. Apparently the swollen, finely divided colloidal material serves to permit the air jets to break up the rubber-cement stream into minute particles as it issues from the gun to cause substantially complete atomization of the cement.

More specifically describing my invention, the same resides in working into rubber while the same is in the solid or semi-solid state, suitable quantities, say from 3 to 10% by weight of the rubber, of a powdered colloidal material, e. g. finely powdered clay, bentonite, casein or the like. The rubber employed may be either raw rubber or reclaimed rubber such as that reclaimed from tire scrap and the like. The incorporation of the powdered colloidal material into the rubber mass is carried out in a manner as to substantially uniformly distribute the material throughout the mass. This may be preferably accomplished by means of a conventional rubber mill, the finely powdered colloidal material being milled into the rubber in a manner similar to that ordinarily employed in incorporating various materials into a rubber mass. To secure the swelling of the colloidal material, a suitable quantity of water, say from 1 to 7 times the quantity of the powdered colloid, is also milled into the rubber, the water being absorbed by the powdered colloid with consequent swelling of the same. The required amount of water may also be supplied by soaking the rubber slabs, chunks or the like containing the finely powdered colloidal material disseminated therein, in a water bath for a period of time sufficient to permit the water to penetrate into the rubber and to come into contact with and be absorbed by substantially all of the colloidal material. According to an alternative operation, the colloidal material may be swollen with water in any suitable manner prior to its incorporation in the rubber and may then be milled or otherwise disseminated into the rubber in the above described or any suitable manner.

The chunks or slabs of rubber containing the powdered swollen colloidal material distributed therein are then cut back with a suitable solvent such as petroleum naphtha, carbon tetrachloride, benzol or the like in any suitable or conventional manner. For example, a conventional rubber churn may be employed for this purpose, the rubber slabs being cut to a suitable size and placed in the churn together with the desired solvent. Any of the usual rubber extenders, fillers, pigments and the like, desired in the final composition, may be added to the solvent and rubber in the churn. The mixture of solvent, rubber and fillers or the like is then subjected to a churning action for a period of from 12 to 24 hours to dissolve or disperse the rubber in the solvent to form the final adhesive cement product. Alternatively and preferably the cutting back of the rubber with the solvent may be accomplished in accordance with the process disclosed in my co-pending application, Serial No. 131,159, filed March 16, 1937. According to this process, briefly described, the rubber slabs are reduced to small fragments in a cutting device of any suitable construction and the rubber is then directly conveyed to a container in which it is mixed with a solvent in the desired proportions and stored for say from 4 to 12 hours. At the termination of the storage period, the rubber solvent mass is transferred from the storage container to a suitable mixer such as a pug mill and the desired pigments, fillers, extenders and the like are added, the resultant mixture being stirred for approximately one-half hour.

As a specific example of a preferred rubber cement, particularly for use in automotive body construction and method of making the same in accordance with my invention, a suitable amount of red tube reclaimed rubber has worked into it while on the mill approximately 3% by weight of the rubber of finely divided bentonite. A quantity of water sufficient to swell the bentonite, say in an amount equal to the quantity of bentonite, is also worked into the rubber on the mill, the bentonite absorbing the water and swelling. The rubber with its contained swollen bentonite is then reduced to fragments in a shredder and placed in drums together with a light petroleum solvent in the proportions of 140 parts of rubber to approximately 140 parts of solvent. The drums are then stored for approximately 12 hours with some slight agitation of their contents at intervals, at the termination of the storage period their contents being emptied into a pug mill and stirred for from 15 to 30 minutes. To obtain an adhesive which will deposit a film exhibiting the desired hardness and adhesive strength, a cut back limed rosin, i. e. rosin treated with 2 to 4% by weight of hydrated lime and then dissolved in a light petroleum naphtha, and additional solvent is added to the material in the pug mill in an amount so that the solid content of the mix is in the proportions of 100 parts reclaimed rubber solids and 175 parts solid limed rosin, the solid content constituting 40% by weight of the whole. These ingredients are then agitated sufficiently to provide a homogeneous adhesive material. For certain uses suitable quantities of bituminous materials may be included therein. For example, a rubber cut back as described above may be modified to provide an adhesive adaptable for many uses by incorporating therein a suitable quantity of a selected asphalt, e. g. albino asphalt, cut back with a light petroleum naphtha or the like. The addition of the asphalt cut back may preferably take place at the time the limed rosin or the like is added.

Having thus described my invention in rather full detail, it will be obvious that these details need not be strictly adhered to and that further uses of the same will suggest themselves to one skilled in the art without departing from the scope of the invention as defined in the subjoined claims.

What I claim is:

1. A composition of matter suitable for use as an adhesive cement comprising a solution of rubber in a volatile solvent, said rubber having incorporated therein from about 3 to about 10% by weight of a water swollen powdered colloidal material whereby to render the composition sprayable without cobwebbing.

2. A composition of matter suitable for use as an adhesive cement comprising a solution of rubber in a volatile solvent, said rubber having incorporated therein from about 3 to about 10% by weight of a water swollen powdered colloidal clay whereby to render the composition sprayable without cobwebbing.

3. A composition of matter suitable for use as an adhesive cement comprising a solution of rubber in a volatile solvent, said rubber having incorporated therein from about 3 to about 10% by weight of water swollen powdered bentonite whereby to render the composition sprayable without cobwebbing.

4. The method of making rubber cut-backs capable of being sprayed without cobwebbing which comprises incorporating a water swollen powdered colloidal material into the rubber in the proportion of about 3 to 10% by weight of the rubber and then dissolving the rubber in a solvent.

5. The method of making rubber cut-backs capable of being sprayed without cobwebbing which comprises incorporating a swollen powdered colloidal material into the rubber in the proportion of about 3 to 10% by weight of the rubber, swelling the colloidal material with water and then dissolving the rubber containing the swollen colloidal material in a rubber solvent.

6. The method of making rubber cut-backs capable of being sprayed without cobwebbing which comprises working into the rubber a powdered colloidal material in the proportion of about 3 to about 10% by weight of the rubber, working into the rubber a sufficient quantity of water to swell said colloidal material and then dissolving the rubber containing the swollen colloidal material in a rubber solvent.

7. The method of preventing solutions of rubber in a volatile solvent from cobwebbing when the same are sprayed which comprises incorporating water swollen powdered colloidal material in the rubber in the proportion of about 3 to about 10% by weight of the rubber before dissolving the rubber in a solvent.

EDWIN O. GROSKOPF.